United States Patent [19]
Oskouy et al.

[11] Patent Number: 5,625,625
[45] Date of Patent: Apr. 29, 1997

[54] METHOD AND APPARATUS FOR PARTITIONING DATA LOAD AND UNLOAD FUNCTIONS WITHIN AN INTERFACE SYSTEM FOR USE WITH AN ASYNCHRONOUS TRANSFER MODE SYSTEM

[75] Inventors: Rasoul M. Oskouy, Fremont; Denny E. Gentry, Palo Alto, both of Calif.

[73] Assignee: Sun Microsystems, Inc., Mountain View, Calif.

[21] Appl. No.: 499,573

[22] Filed: Jul. 7, 1995

[51] Int. Cl.$^6$ ............................................. H04L 12/56
[52] U.S. Cl. ......................... 370/395; 370/412; 370/474
[58] Field of Search ............................... 370/60.1, 61, 60, 370/94.1, 99, 85.13, 94.2

[56] References Cited

U.S. PATENT DOCUMENTS

| | | | |
|---|---|---|---|
| 5,214,642 | 5/1993 | Kunimoto et al. | 370/82 |
| 5,274,768 | 12/1993 | Traw et al. | 370/60.1 |
| 5,379,297 | 1/1995 | Glover et al. | 370/60.1 |
| 5,412,655 | 5/1995 | Yamada et al. | 370/60.1 |
| 5,420,858 | 5/1995 | Marshall et al. | 370/60.1 |

Primary Examiner—Douglas W. Olms
Assistant Examiner—Matthew C. Phillips
Attorney, Agent, or Firm—Blakely Sokoloff Taylor & Zafman LLP

[57] ABSTRACT

The asynchronous transfer mode (ATM) interface, which may be a segmentation and reassembly unit, controls segmentation of packets into cells and reassembly of cells into packets for interconnecting a computer system to an ATM system. An architecture is disclosed which partitions load and unload functions within the ATM interface. The load and unload functions are separately partitioned for segmentation and for reassembly. For segmentation, a transmit load engine controls storage of data from packets into an external buffer memory; whereas transmit unload engine handles extracting data from the memory, segmenting the data into cells, and transmitting the cells to the ATM system. For reassembly, a receive load engine handles receiving and storing the cells corresponding to the packets into a memory; whereas a receive unload engine controls extraction of the data from the memory and transmission of the packets to the computer system. Communication between the partitioned load and unload engines is achieved using a scheduler queue. For segmentation, the transmit unload engine schedules operation of the transmit load engine by specifying particular virtual or physical data connections for servicing within the scheduler. The transmit load engine services the data connections in the order appearing in the scheduler queue. A data connection is scheduled either when new packets are available on a previously idle connection or when a data queue within the memory containing data for segmentation reaches a nearly empty threshold. Similar logic is employed for facilitating communication between the receive load engine and the receive unload engine with several minor differences.

18 Claims, 5 Drawing Sheets

TRANSMIT MODE ARCHITECTURE

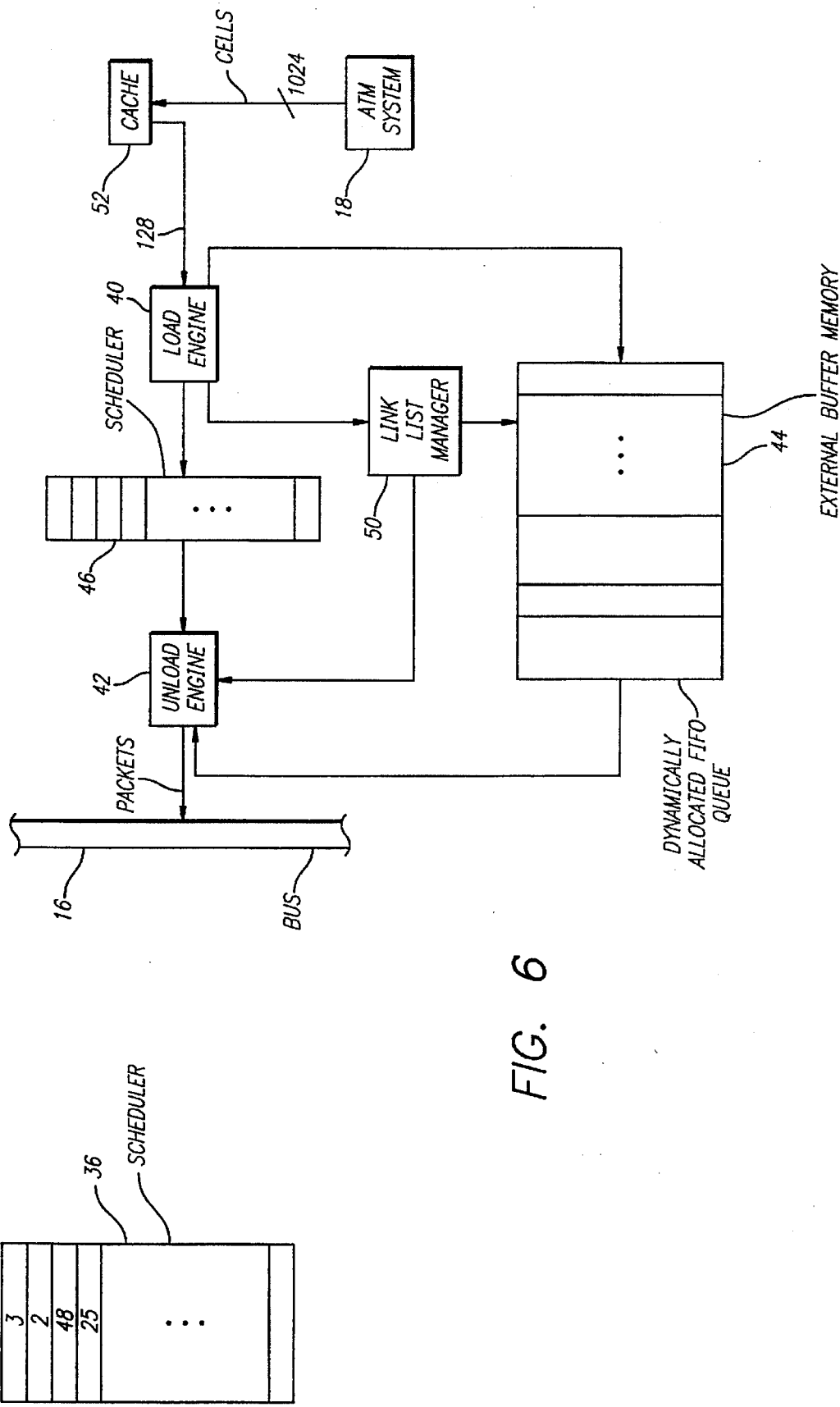

METHOD AND APPARATUS FOR PARTITIONING DATA LOAD AND UNLOAD FUNCTIONS WITHIN AN INTERFACE SYSTEM FOR USE WITH AN ASYNCHRONOUS TRANSFER MODE SYSTEM

BACKGROUND OF THE INVENTION

1. Field of the Invention

The invention generally relates to interface systems for interfacing a computer system host to an asynchronous transfer mode (ATM) system and in particular to partitioning load and unload functions for use with segmentation and reassembly of packets and cells within such an interface system.

2. Description of the Related Art

ATM technology is emerging as the preferred technology for implementing broadband integrated services data networks ISDNs (B-ISDN). A B-ISDN is a system for interconnecting computer systems, local area networks (LANs), telephones, facsimiles, etc., to facilitate communication of data, voice and video between the systems. B-ISDN typically employs fiber optics as a communication medium. An ATM system facilitates the transmission of data over the B-ISDN by defining a set of "data connections" where each connection represents a virtual circuit having a particular source and destination and an associated data transmission.

Data provided by a computer system, LAN, telephone, etc., may initially be stored in packets of data. ATM-based systems, however, transmit and process cells of data. Accordingly, a method or apparatus must be provided for converting packets into cells (segmentation) and for converting cells into packets (reassembly). Both segmentation and reassembly are two-step processes. For segmentation, packets are received from the host system and stored in memory (load), then converted to cells and output to the ATM system (unload). For reassembly, cells are received from the ATM system, assembled into packets and stored in memory (load), then extracted from memory and output to the host bus (unload).

Conventionally, an application specific integrated circuit (ASIC) segmentation and reassembly (SAR) chip is provided which performs the aforementioned segmentation and reassembly processes. The conventional SAR chip, however, does not separate the load and unload steps, either functionally, logically or physically. In other words, load and unload components are integrated together.

Certain disadvantages, however, occur as a result of the integration of load and unload components. Load components must account for any constraints imposed by the host, but need not be constrained by ATM-specific requirements. Likewise, unload components are subject to limitations imposed by the ATM, but are unaffected by any limitations of the host. Therefore, any modification to the host need only affect the load components and any modification to the ATM system need only affect the unload components. Yet, when load and unload components are integrated as in conventional SAR chips, a modification to either the host or the ATM system may require a complete re-design of the SAR chip. Moreover, the integration of load and unload components can prevent the exploitation of circuitry optimized for use only with the host or only with the ATM system.

It would be desirable, therefore, to provide an improved ATM system interface shown as a SAR chip which avoids the disadvantages arising in systems providing integrated load and unload components. Aspects of the present invention are drawn to such an improved system. In particular, it is an objective of the invention to partition the load and unload components of the segmentation process and also to partition the load and unload functions of the reassembly process.

Any attempt to partition the load and unload components, however, must provide for adequate communication between the partitioned components to allow efficient throughput of data. Such is particularly problematic within ATM system interfaces configured to accommodate the transmission of data on a plurality of data connections each potentially operating at different data transmission rates. For example, if an external buffer memory is employed to facilitate the overall transfer of cells, a partitioned load component may need to repeatedly poll queues within the external buffer memory that correspond to different transmission rates to determine when additional cells should be loaded therein. Accordingly, another objective of the invention is to provide an efficient technique for allowing partitioned load and unload components to communicate with each other to provide for efficient throughput of data while also eliminating the need for polling if an external buffer memory is used.

SUMMARY OF THE INVENTION

The invention provides a system for segmenting packets into cells and for reassembling cells into packets for use in interconnecting a host system with an ATM system, wherein load and unload segmentation components are partitioned and wherein load and unload reassembly components are partitioned. An efficient method and apparatus for allowing the partitioned load and unload components to communicate while operating separately is also provided. The ATM system may employ the UTOPIA protocol.

In accordance with one embodiment, the foregoing is achieved as follows. A transmit mode architecture is provided which includes a buffer means, such as an external buffer memory, for buffering data in a plurality of first-in-first-out (FIFO) queues. The external buffer memory provides one FIFO queue for each of a plurality of data connections, each of which may operate at a different transmission rate. A transmit load means or "load engine" controls storage of packets of data corresponding to any of the data connections in the associated FIFO queue of the buffer. An unload means or "unload engine" extracts the packets from the FIFO queues of the buffer and segments the data contained therein into cells for outputting to the ATM system on the associated data connection.

A scheduling means or "scheduler" interconnects the load and unload engines for providing communication therebetween and for ensuring that adequate rate control is maintained. The scheduler includes a single FIFO queue for storing values representing the separate data connections. In use, the unload engine extracts data from one of the FIFO queues of the external buffer memory at a rate specified for the corresponding data connection until the FIFO queue is nearly empty. Then, to signal the load engine that additional data should be stored within the nearly empty queue, the unload engine stores a value representative of the data connection associated with the nearly empty external buffer memory queue into the scheduler queue. The load engine reads the values from the scheduler queue in a first-in-first-out fashion and services the data connections to have packets of data stored into the corresponding FIFO queues of the external buffer.

Hence, the load engine operates as a slave to the unload engine by reading data connection values from the scheduler, in the order determined by the unload engine, then servicing the corresponding connection. In this manner, the unload engine effectively "schedules" the operation of the load engine by specifying the order by which the load engine must service the various data connections.

As noted above, the system may process data on a plurality of connections each having a different data transmission rate. Queues of the external buffer memory corresponding to fast data connections will likely require additional data more often than those corresponding to slow data connections. As such, the fast data connections will be scheduled more often in the scheduler than the slow data connections and the load engine will service the faster data connections more often than the slower data connections, thereby accommodating the higher data rate of the faster connections.

Load and unload components for receive or reassembly are partitioned in much the same manner as with segmentation or transmit. A receive mode architecture is provided which includes an external buffer memory for buffering data received from the ATM system for subsequent transmission to the host. A receive load engine receives cells of data from the ATM, assembles those cells into packets, and stores the packets into the external buffer memory. A receive unload engine controls the extraction of packets of data from the external buffer memory for forwarding to the host. A receive scheduler, having a FIFO queue, allows the receive load engine to schedule the operation of the receive unload engine in accordance with the order by which queues of the external buffer memory are filled. However, whereas the transmit external buffer memory includes one FIFO queue for each data connection, the receive external buffer memory is dynamically allocated or partitioned such that, at any given time, it may provide a queue for one data connection or memory queues for a plurality of data connections. In one embodiment, the receive external buffer memory is configured with a dynamic link list to facilitate dynamic allocation of buffer resources. When a link list is used, cells are stored in the external buffer memory in a linked fashion to provide a virtual or logical queue containing cells corresponding to a single data connection.

Hence, with the invention, an interface system, such as SAR chip, is provided for interconnecting a host system to an ATM system wherein load and unload components for both receive and transmit are partitioned. As such, circuitry employed to implement the load and unload components may be configured or optimized for use with either the host or the ATM system to which it connects. Accordingly, any modification to either the host or ATM specifications does not require a complete re-design of the overall receive or transmit circuitry, but may require only a re-design of the appropriate load or unload components. Partitioning of the load and unload components also facilitates the development of enhancements provided for interconnecting with alternative hosts or alternative B-ISDN interfaces. For example, if the ATM system is replaced with an alternative system or if the computer system is replaced with an alternative system, re-design of the ATM interface may be limited to only re-design of either only the load and unload components. The partitioning of load and unload components also facilitates the identification and fixing of bugs in the system. The manner by which the load and unload components are partitioned, by employing a scheduler in combination with an external buffer memory, allows clean partitioning while also providing for efficient control over a plurality of data connections having different data rates.

Accordingly, the objectives of the invention set forth above are achieved. Other objects, feature and advantages of the invention will be apparent from the attached drawings and from the description of the invention which follows.

BRIEF DESCRIPTION OF THE DRAWINGS

FIG. 5 is a block diagram illustrating the segmentation unit of FIG. 4 with exemplary data stored therein.

FIG. 6 is a block diagram of the ATM system interface of FIG. 1 related to receiving data and particularly illustrating a load engine, an unload engine, a segmentation unit and a dynamically allocated external buffer memory.

EXEMPLARY EMBODIMENTS OF DETAILED DESCRIPTION OF THE INVENTION

Referring to the figures, exemplary embodiments of the invention will now be described. Initially, principles of the invention applicable to a wide variety of specific embodiments will be described with reference to FIG. 1–6. Then, a specific exemplary implementation of the invention, and an overall network in which it may be employed, will be described with reference to FIGS. 7 and 8.

Figure 1:
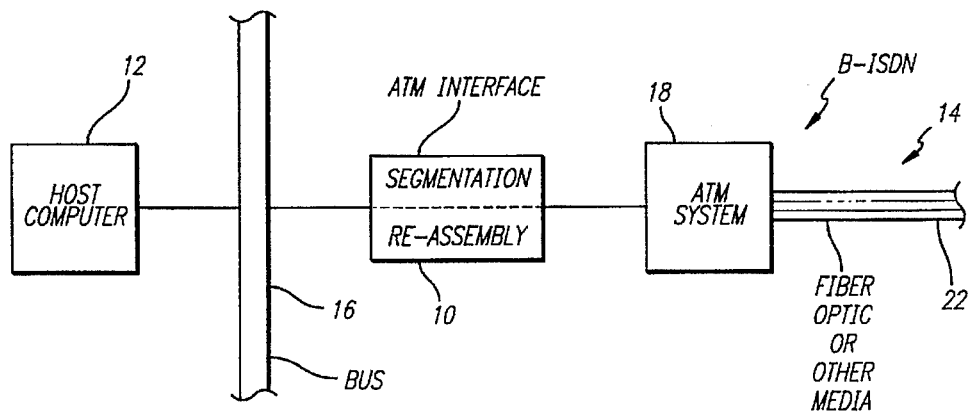
FIG. 1 is a block diagram illustrating an ATM interface system for converting packets into cells and vice versa.

FIG. 1 illustrates an ATM system interface 10 interconnecting a host computer system 12 and an ATM-based B-ISDN communication system 14. Connection to the host computer may employ a system bus 16. Connection to the B-ISDN is provided through an ATM system 18 which may be a SAR chip. In one embodiment, host computer 12 may be a Sun Computer Workstation. ATM system 18 may include a SONET framer employing UTOPIA protocol for transmitting data along a fiber optic cable 20 or other media. However, ATM interface 10 may be employed in combination with other systems or equipment. Indeed, principles of the invention may be exploited in non-ATM systems as well.

ATM interface 10 operates to convert packets received from host system 12 into cells for transmission to ATM system 18 and vice versa.

Packets may be transmitted from host system 12 to interface system 10 using bus 16. In other embodiments, a direct memory access (DMA) controller (not shown) may be employed to facilitate transmission of data. The exact means by which data is transferred from host system 12 to interface system 10 is not necessarily pertinent in the invention and will, therefore, not be described in detail.

Conversion of packets to cells is referred to as segmentation or "cellification". Conversion of cells to packets is referred to as reassembly or "packetization". Herein, the overall process of segmenting the packets into cells and transmitting the cells is referred to as "transmit mode". The overall process of receiving cells and reassembling cells into packets is referred to as "receive mode".

Figure 2:
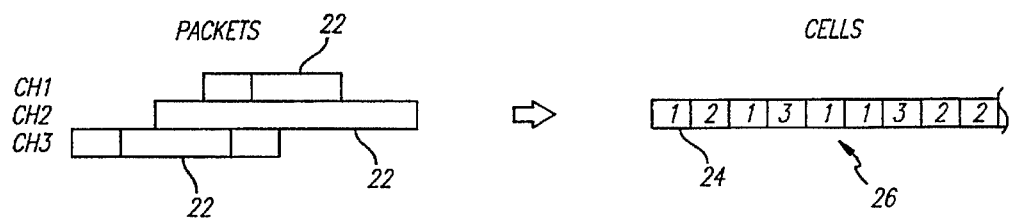
FIG. 2 is a block diagram illustration the conversion of packets of data corresponding to different data communication connections into interleaved cells.
Figure 3:
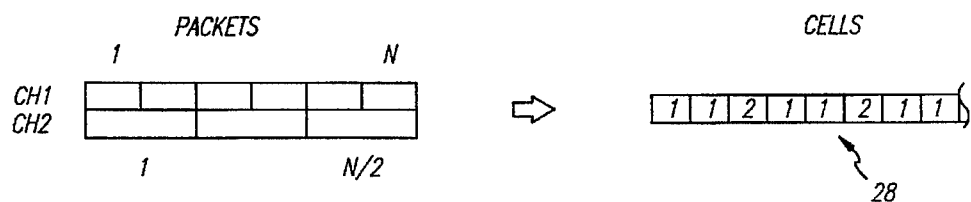
FIG. 3 is a block diagram illustrating the conversion of packets of data transmitted at different data rates on separate data connections into interleaved cells.

As noted above, ATM interface 10 is provided to allow the host computer, which is configured to process packets, to transfer data to the ATM system, which is configured to process cells. Packets may be of differing lengths. Cells are of uniform size. The relationship of packets and cells is illustrated in FIGS. 2 and 3. FIG. 2 illustrates sets of packets 22 transmitted on three separate data connections or channels being converted to a set of interleaved cells 24 of uniform size. As illustrated, packets 22 may be of different sizes or lengths and may start and stop at different times. Moreover, a particular communication of data may be contained within a single packet, as shown transmitted on connection 2, or in two or more packets as shown transmitted on connections 1 and 3.

Cells, however, are of equal size with each cell providing a chunk of data from one of the packets. Cells containing data corresponding to packets of different connections are interleaved. In FIG. 2, numbers 1, 2 and 3, within a resulting cell stream 26, identify the data connection from which the particular cell of data has been extracted. As illustrated, data from the different data connections are interleaved within the cell stream.

The data connections providing the packets may correspond to physical transmission connections or to virtual connections. In general, a data connection may represent a virtual circuit connecting any two entities within an overall network system. The data connections may operate to transmit data at different rates. For example, one connection may operate at 10 megabits per second (Mbps) and another at 20 Mbps. This is illustrated in FIG. 2 wherein connection 1 operates at a transmission rate twice that of connection 2. As illustrated, N bytes of data are transmitted on connection 1 in the same time period as N/2 bytes are transmitted on connection 2. To accommodate the faster transmission rate of connection 1, data cells extracted from connection 1 are transmitted within interleaved cell stream 28 twice as often as cells received from connection 2. In this manner, the higher data rate of connection 1 is accounted for while also ensuring that data from connection 2 is also transmitted. It should be noted that strict two to one interleaving of cells from connections 1 and 2 is not required. Rather, it is sufficient that, on the average, cells from connection 1 appear about twice as often as cells from connection 2.

The manner by which ATM interface 10 segments packets into cells and reassembles cells into packets in an environment having multiple data connections each potentially operating at different data rates will now be described. First, the transmit mode system for segmenting packets into cells will be described with reference to FIGS. 4 and 5, then, the receive mode system for reassembling cells into packets will be described with reference to FIG. 6.

TRANSMIT MODE

Figure 4:
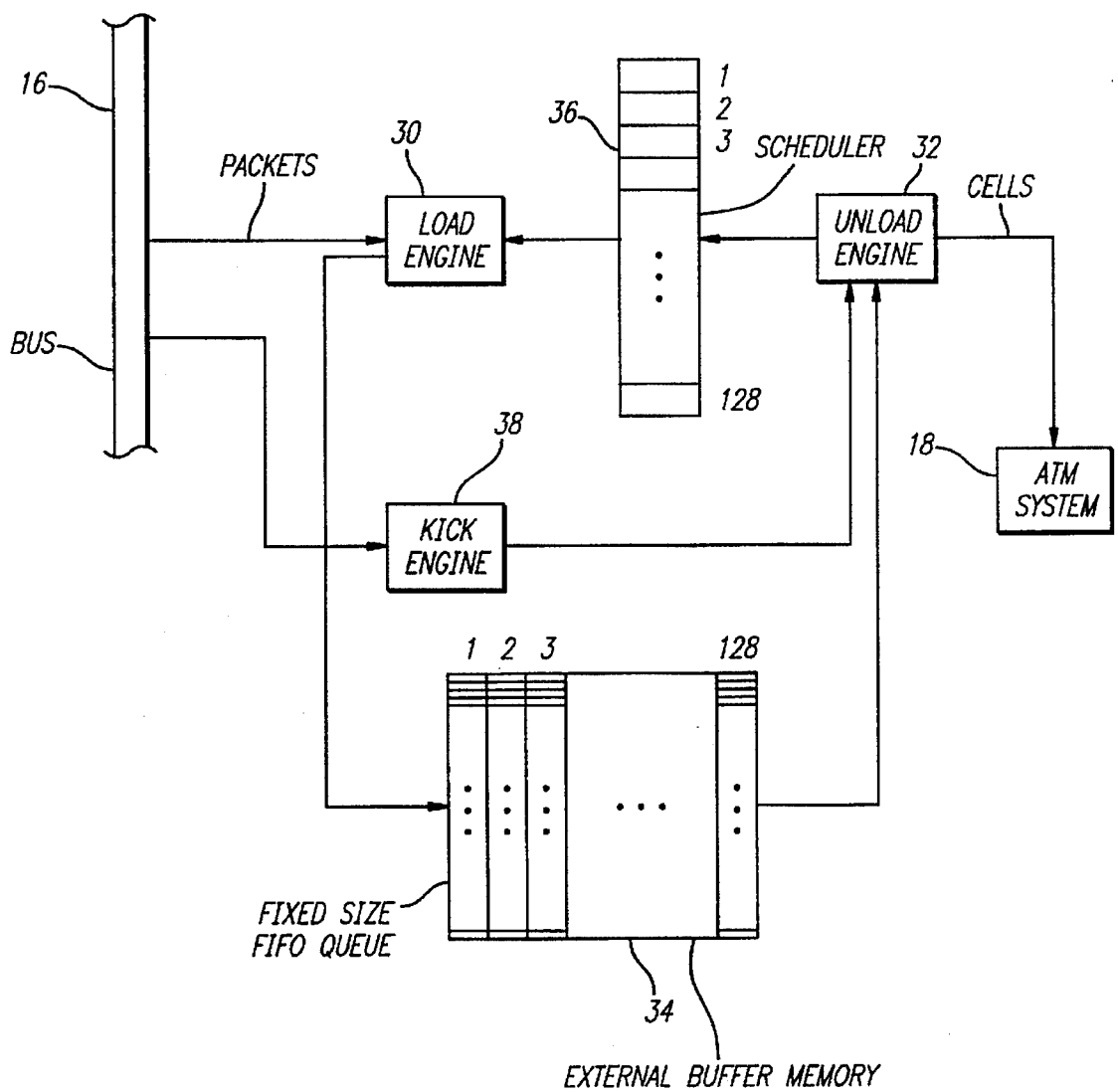
FIG. 4 is a block diagram illustrating components of the interface system of FIG. 1 related to transmitting data and particularly illustrating a load engine, an unload engine, a segmentation unit and an external buffer memory.

FIG. 4 illustrates internal components of ATM interface 10 in connection with bus 16 and ATM system 18. As its principle components, ATM interface 10 includes a load engine 30, an unload engine 32, an external buffer memory 34, a scheduler 36, and a kick engine 38. Load engine 30 controls transfer of packets of data corresponding to any of 128 physical data transmission connections from bus 16 or directly from a host memory (not shown) if a DMA controller (also not shown) is employed. External buffer memory 34 includes 128 FIFO queues, one for each of 128 physical data connections, for storing data from the packets. Unload engine 32 extracts data from the FIFO queues of memory 34 and segments the data into cells for transmission to ATM system 18. Techniques for storing packets of data in FIFO queues and for extracting data therefrom and segmenting that into cells is well understood by those skilled in the art and will not be described in detail herein.

At any one time, load engine 30 is capable of servicing only one of the 128 connections. Likewise, at any one time, unload engine 32 is capable of extracting data from only one of the queues of memory 34. Scheduler 36 is provided to facilitate the selection of connections for servicing by the load engine while accommodating the potential for widely varying data transmission rates between the various connections. Kick engine 38 is provided to alert the unload engine that packets of data corresponding to one of the data connections is available for transfer into the external buffer memory. The unload engine, in turn, schedules the operation of the load engine.

Briefly, the operation of load engine 30 is scheduled by unload engine 32 through scheduler 36. Unload engine 32 stores a list of data connections to be serviced by load engine 30 within scheduler 36, in the order by which the connections are to be serviced. Load engine 30 does not initiate storage of data into memory 34 until the corresponding data connection has been scheduled by unload engine 32 within scheduler 36. Initially, when a new packet of data is available along a data connection previously idle, kick engine 38 signals unload engine 32 that the new data is available. Unload engine 32 responds by scheduling the data connection in scheduler 36.

Assuming that scheduler 36 is initially empty, then the data connection carrying the new data will be the first connection scheduled therein. Load engine 30 then reads the data connection number from the scheduler and begins servicing the connection by initiating storage of data available on the connection in the corresponding FIFO queue of memory 34. For example, if the data is available for data connection 3, then the data is stored in FIFO queue #3 of memory 34. Data from the packet is stored in memory 34 until either the FIFO queue of the corresponding connection within memory 34 is nearly full or until an end of packet is reached.

If additional data packets are available on other connections while load engine is servicing connection 3, then the additional connections will be scheduled in order within the scheduler following connection 3. This is illustrated in FIG. 5 which shows connection 3 as the first entry with exemplary connections 2, 48, and 28 scheduled thereafter. Scheduling of any additional connections while connection 3 is being serviced occurs in the same manner whereby the kick engine detects the availability of new data and signals unload engine 32 which stores the connection number or some value representative thereof in scheduler 36. Note that the depth of the scheduler queue is limited to the number of physical connections being serviced. In other words, any particular physical connection is scheduled only once within the scheduler. The maximum number of connections that can be scheduled is 128, corresponding to the maximum number of physical connections available in the exemplary system.

Thus far, the example describes only the scheduling of previously idle data connections for which a new data packet is available. However, data connections are also scheduled within scheduler 36 as data is extracted from memory 34 by unload engine 32. More specifically, as soon as a sufficient amount of data is stored in one of the FIFO queues of memory 34, unload engine 32 begins to extract data from the queue for segmentation and transmission to ATM system 18. As noted above, cells are interleaved for transmission to ATM system 18. As such, unload engine 32 selectively extracts one cell worth of data from each FIFO queue into the output ATM cell stream. If all data connections share the same transmission rate, then unload engine 32 extracts an equal number of cells from each queue in memory 34 with uniform frequency. If, however, the data connections have differing rates, then unload engine 32 extracts more cells from those queues corresponding to faster rate connections than from those queues corresponding to slower rate connections. The logic by which unload engine 32 selects particular data connections for extracting cells and the manner by which the cells are interleaved may be performed in accordance with techniques well understood by those skilled in the art and such techniques will not be described herein.

In any case, for any particular data connection, the corresponding queue in memory 34 will eventually be emptied and require additional data. Accordingly, as unload engine extracts data from a selected queue of memory 34, the unload engine determines whether a threshold has been reached indicating that the queue is nearly empty. When such a threshold is reached, the unload engine places a value identifying the connection corresponding to the nearly empty queue within scheduler 36 causing load engine 30 to eventually service the corresponding connection by placing additional data into the nearly empty FIFO queue. Servicing of the connection corresponding to the nearly empty queue by the load engine may not be immediate. Rather, servicing of the connection must wait pending servicing of any previously scheduled connections identified within scheduler 36.

As can be appreciated, the foregoing steps of scheduling previously idle connections and scheduling active connections for which the corresponding FIFO queue has become nearly empty proceed continuously as packets of data are received on various connections, stored in memory 34 and subsequently extracted and segmented for transmission to ATM system 18.

Eventually the last data corresponding to the end of particular data transmission on a particular connection is stored within memory 34. The end of a transmission may be signaled by, for example, storing an indication of an end of packet within memory 34. Other techniques may be employed for data transmissions comprising several packets. In any case, unload engine 32 detects the end of the transmission and extracts the remaining data corresponding to the transmission from memory 34. The corresponding data connection is not scheduled again until a new transmission is available along the connection at which time kick engine 38 again signals unload engine 32 causing the unload engine to "wake up" for that particular connection. The unload engine then schedules load engine 30 to again service the previously idle connection.

To briefly summarize, external buffer memory 34 includes one FIFO queue for each physical data connection. However, no data is stored in queues of memory 34 until load engine 30 is scheduled to service the corresponding input data connection by unload engine 32 via scheduler queue 36. As such, the load engine operates as a slave to the unload engine. In this manner, the unload engine controls the rate at which data is received from bus 16 on each of the physical data connections. This is particularly desirable since the rate of data throughput for the various connections is mandated or specified by the ATM system requirements. In other words, ATM interface 10 has no control over the rate by which data is to be transmitted to the ATM system and can only control the rate at which packets are received. Hence, by providing a load engine which is a slave to the unload engine, the rate of packet input for any particular connection is controlled to "pace" the rate at which corresponding cells for that connection are transmitted to the ATM system. By scheduling connections within scheduler 36, the unload engine ensures that each of the currently active connections are serviced by the load engine while also ensuring that those connections having faster data rates are serviced more often. The latter occurs as a natural result of scheduling connections as the corresponding FIFO queues become empty.

The foregoing is achieved without unduly compromising the data transmission rates for slow data connections. Rather, cells corresponding to slower data connections appear in the output ATM stream at an average cell "frequency" commensurate with the slower data rate. (See, for example, FIG. 3.) The throughput of data on slower data connections is effectively "guaranteed" by the mechanism of scheduler 36. More specifically, once a data connection, whether slow or fast, is scheduled within the scheduler, it takes precedence over any subsequently scheduled data connection, even if the subsequent connection has a much faster transmission rate. Of course, alternative implementations may be designed wherein one or more data connections, perhaps as a result of very high data rates, are given priority over slower data rate connections in all circumstances. Such can be implemented using appropriate modifications to the system illustrated in FIG. 4, perhaps by allowing unload engine 32 to insert data connection values within scheduler 36 ahead of previously scheduled data connections. As can be appreciated, a wide range of alternative embodiments may be employed consistent with the general principles of the invention. Moreover, actual implementation of the functions illustrated in FIG. 4 may be achieved using a wide range of hardware or software embodiments.

RECEIVE MODE

The receive mode of ATM interface 10 will now be described with reference to FIG. 6. The receive mode operates in much the same manner as the transmit mode but with a few differences. Only the differences between the receive mode and transmit mode will be described in detail.

FIG. 6 illustrates the receive mode architecture or reassembly architecture of ATM interface 10. A load engine 40 receives cells from ATM system 18 for storage in external buffer memory 44. The load engine stores the cells within the external buffer memory in virtual queues which allow the unload engine to selectively extract only those cells corresponding to packets from selected data connections. The packets of cells within the external buffer memory are transferred to the host computer under the control of the unload engine. As before, transfer of data between the host system and the external buffer memory may be executed by a DMA.

A scheduler 46 allows load engine 40 to schedule the operation of unload engine 42. In contrast to the transmit mode architecture wherein the load engine is a slave to the unload engine, within the receive mode architecture, the unload engine is a slave to the load engine. As noted above, there is no control over the receipt of cells from the ATM system. Accordingly, the receive load engine needs to be immediately responsive to cells received and hence cannot efficiently operate as a slave to the unload engine. Also, because the receive load engine is immediately responsive to cells received from ATM system 18, no kick engine (such as kick engine 38 of FIG. 4) is required. Furthermore, whereas memory 34 of the transmit mode is equally partitioned to provide FIFO queues for each of 128 physical connections, external buffer memory 44 of the receive mode is a dynamically allocated memory capable of providing only a single virtual or logical queue or a plurality of such queues. Again, the difference is necessitated by the requirement to be immediately responsive to cells received from the ATM system. If many cells are received corresponding to a single data connection, then a large portion of memory 44 may be required. Accordingly, the equal queue size limitation imposed on the transmit side is not imposed on the receive side. Dynamic allocation of resources within buffer 44 to allow virtual queues is controlled by a link list manager 50 which interconnects the memory with load engine 40. Cells are stored within buffer 44 with cell pointers pointing to other cells corresponding to the same data connection. The link-listed cells formed the aforementioned virtual or logical queue. Link list manager 50 coordinates the storage of cells and the extraction of cells in accordance with the various pointers.

In operation, cells received by load engine 40 are stored, one cell at a time, within memory 44. Whenever at least three cells per connection are stored in memory 44, a value representative of the connection is inserted within the FIFO queue of scheduler 46. The unload engine controls extraction of data from buffer 44 in accordance with the connection ordering imposed by scheduler 46.

As with the transmit mode, differences in data transmission rates on different connections is efficiently managed through the scheduler. Connections having fast data rates are scheduled more often than those having slower data rates. By servicing connections in the order scheduled, the receive unload engine thereby keeps pace with the receive load engine. Of course, circumstances may arise where too much data is received too fast, perhaps resulting in the entire memory 44 becoming full before the receive unload engine can service the appropriate connections and have the data removed. Such circumstances arise not as a result of the invention but can arise in conventional data transmission systems as well. Conventional techniques may be employed to handle any possible overflow circumstances. Also, as with the transmit mode, the receive mode may be configured to grant higher priorities to certain data connections requiring those connections to be serviced by the receive unload engine even if other connections are previously scheduled.

One further difference between the receive mode architecture and the transmit mode architecture is that a cache 52 may be provided for caching data connection information. In one embodiment, the cache allows for 1024 virtual data connections to be accommodated, even though the receive mode architecture provides for only 128 physical data connections. Briefly, data connection information is cached to associate virtual connection information to an actual physical channel. Circumstances may arrive where connection information stored within the cache for a particular virtual connection may need to be flushed. However, the receive mode architecture is configured to prevent a virtual connection from being flushed if the physical connection corresponding thereto has already been scheduled within scheduler 46. Other mechanisms for handling cache flushes may alternatively be employed.

EXEMPLARY EMBODIMENT

The forgoing describes, at a high level, important aspects of exemplary embodiments of the invention. In the following, a specific ASIC will be described which embodies the invention. A network employing the ASIC is also described.

Figure 7:
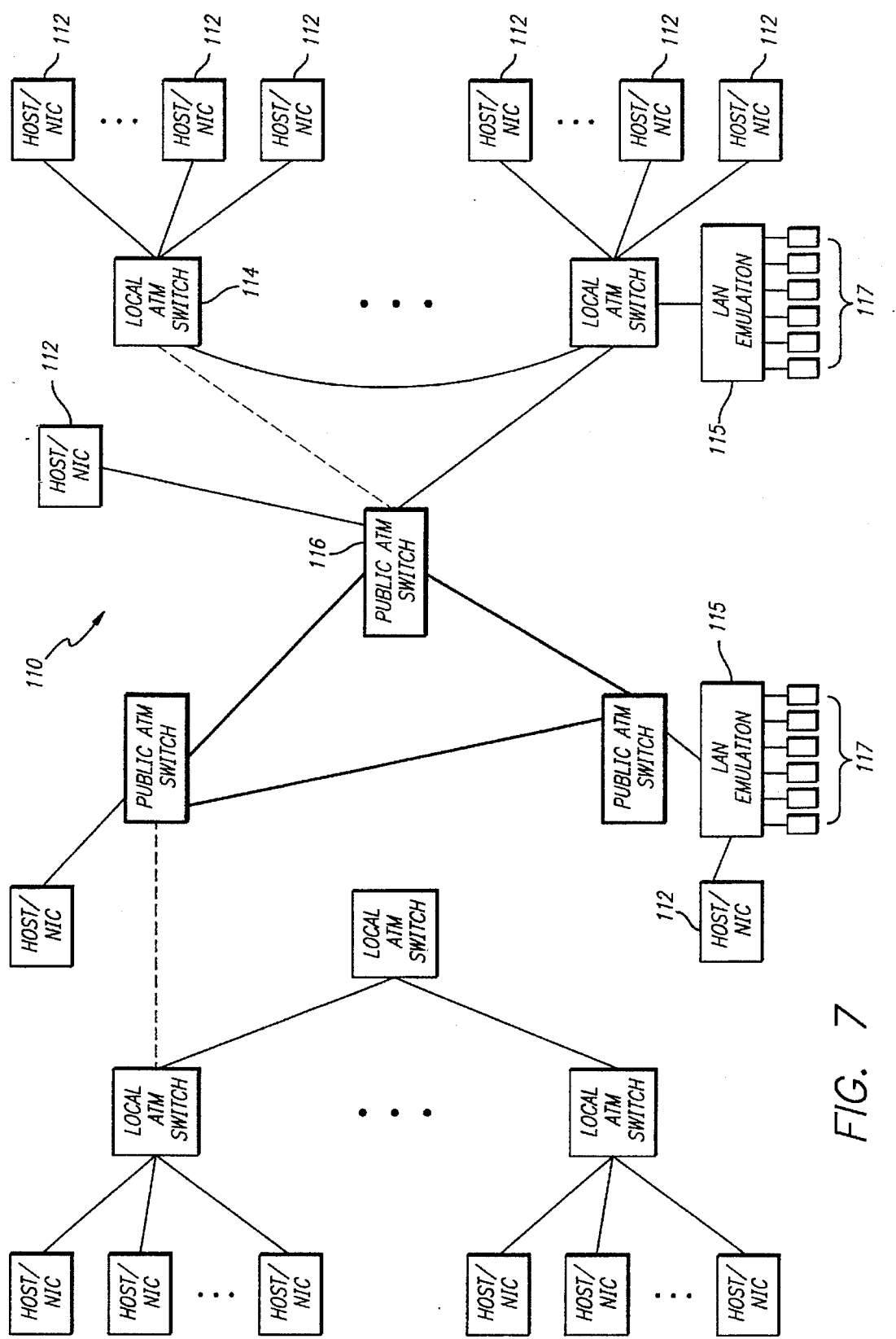
FIG. 7 is a block diagram illustrating a network employing the ATM system interface of FIGS. 1–6.

FIG. 7 illustrates an exemplary computer system network 100 incorporating the ATM interface of FIGS. 1–6. Computer system network 100 includes host computer systems (not shown) which incorporate one or more network interface circuit (NIC) SAR ASICs, embodying the architecture illustrated in FIGS. 1–6. The SAR ASICs 112 are coupled through a local ATM switch 114 to a public ATM switch 116 to enable asynchronous transfer of data between host computer systems coupled to the network 110. Alternately, SAR ASICs 112 can be coupled directly to public ATM switch 116. As shown in FIG. 7, computer system network 110 may also include computer systems which incorporate the use of a LAN emulator 115 which serves as a gateway for connecting other networks such as Ethernet or token ring networks 119 which utilize the ATM network as a supporting framework.

Figure 8:
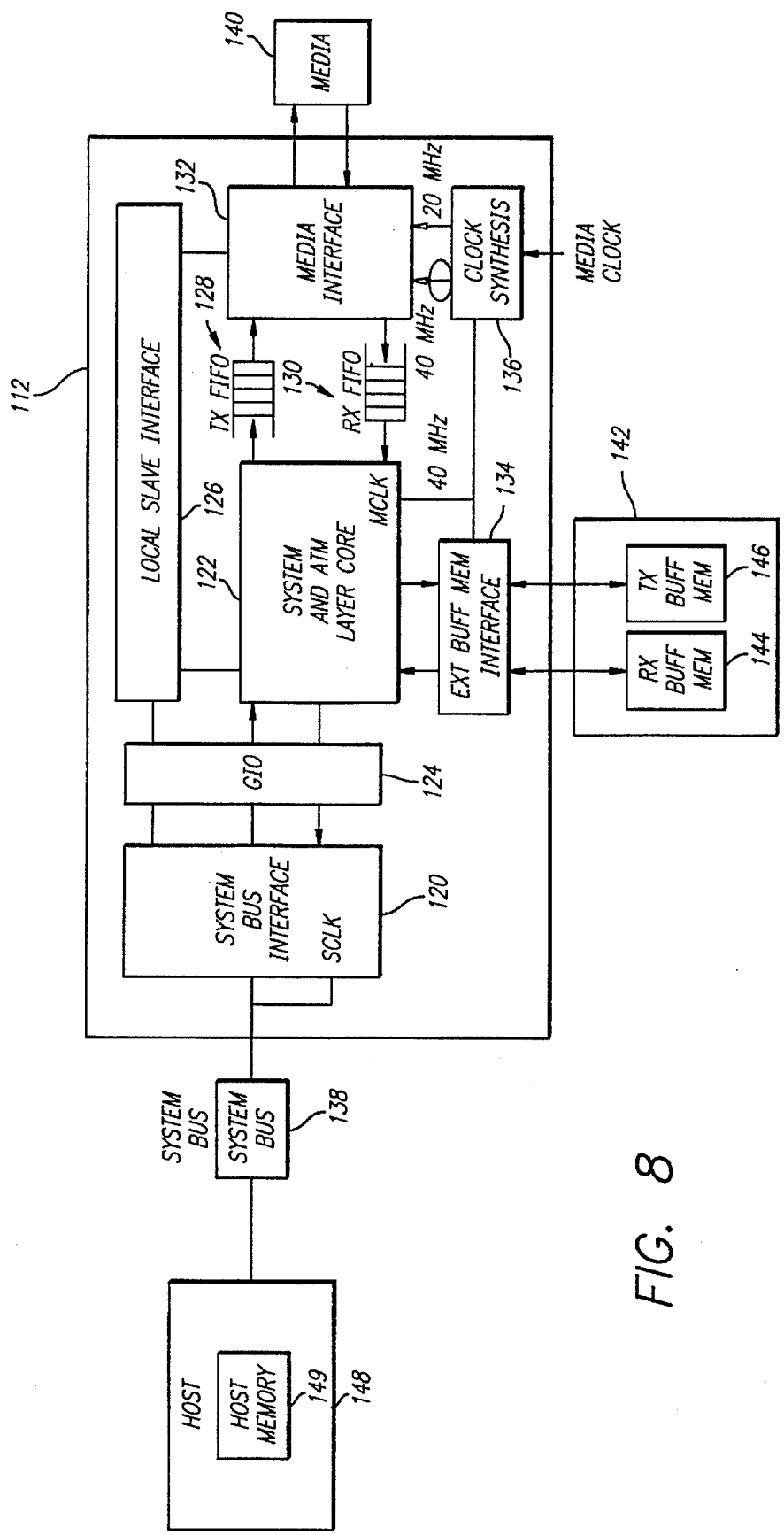
FIG. 8 is a block diagram illustrating an exemplary embodiment of the ATM system interface of FIGS. 1–6 for use within the network illustrated in FIG. 7.

FIG. 8 is a simplified system diagram illustrating the architecture of the SAR ASIC 112. SAR ASIC 112 interfaces the host computer system coupled through system bus 138 to network media 140 operating in accordance with the ATM protocol.

SAR ASIC 112 shown includes a System Bus Interface 120, a Generic Input/Output ("GIO") interface 124, a System and ATM Layer Core 122, a Local Slave interface 126, an array of transmit (TX) FIFOS 128, an array of receive (RX) FIFOS 130, a Media interface 132, an External Buffer Memory Interface 134 and clock synthesis circuit 136.

Together, elements 120–136 of network interface circuit 112 cooperate to asynchronously transfer data between the host computer and the other computers in the network through multiple, dynamically allocated connections in multiple bandwidth groups. Collectively, the elements of SAR ASIC 112 function as a multi-connection intelligent DMA controller coupled to System Bus 138 of the host computer system. Multiple transmit and receive connections are serviced as virtual connections utilizing a full duplex 155/622 Mbps physical link. Multiple packets of data, subscribed to different connections over the System Bus 138 to the external buffer memory 142, via the External Buffer Memory Interface 134, are segmented by the System and ATM Layer Core 122 into transmit cells for transmission to the Media 140 through Media interface 132.

Core 122 also includes reassembly logic to facilitate reassembly of the receive packets. The TX and RX FIFOS 128, 130, coupled between the Core 122 and the Media Interface 132, stage the transmit and receive cell payloads of the transmit and receive packets respectively. The Media Interface 132 transmits and receives cells to the Media 140 of the network, driven by clock signals provided by Clock Synthesis Circuit 136. The Media, and therefore the Media interface 132, conforms to the UTOPIA standard, as described by the ATM Forum Ad Hoc specification. To conform to the UTOPIA specification, clock synthesis circuit 136 provides either a clock signal of 20 MHz or 40 MHz to enable Media interface 132 to support a byte stream at 20 MHz for 155 Mbps or a 16 bit stream at 40 MHz for a 622 Mbps data stream.

Media Interface 132 receives 52-byte data cells each having a 4-byte cell header and a 48-byte payload from the TX FIFO 128. Media Interface 132 inserts a checksum as a fifth byte to the cell header into each cell prior to providing the 53-byte data cell to the Media 140. Conversely, when Media Interface 132 receives cells from the Media 140, interface 132 examines the checksum in the fifth byte of each cell to determine if the checksum is correct. If so, the byte representing the checksum is stripped from the cell and the cell is forwarded to the RX FIFO 130. Otherwise, the entire cell is dropped.

The System Bus Interface 120 and Generic I/O interface 124 insulate the host computer system from the specifics of the transfer to Media 140. Furthermore, Core 122 is insulated from the specifics of system bus 138 and host data structure. In one embodiment, the System Bus is an SBus, as specified in the Institute of Electronics and Electrical Engineers ("IEEE") standard 1496 specification. System Bus Interface 120 is configured to communicate in accordance with the specifications of the SBus. System Bus Interface 120 can be configured to conform to different host computer system busses. System Bus Interface 120 is also configured to transfer and receive data in accordance with the protocols specified by Generic I/O interface 124. Generic I/O interface 124 provides a singular interface through which Core 122 communicates with the host computer. Thus, Core 122 need not be changed for different embodiments of SAR ASIC 112 which interface to different host computer systems and busses.

As noted previously, the SAR ASIC 112 also shields the cell delineation details of asynchronous transfer from the applications running on the host computer system. For present purposes, it is assumed that software running on the host computer system 148 manage transmit and receive data using wrap around transmit and receive rings with packet interfaces as is well-known in the art What has been described is an ATM interface system for handling segmentation of packets into cells and reassembly of cells into packets for use in interconnecting a system bus connected to one or more host computers to a B-ISDN system operating with ATM. Principles of the invention, however, can be applied to other systems as well and may find utility in any data conversion system, particularly wherein the multiple connections are provided, each possibly operating at different data transmission rates. Moreover, principles of the invention also apply to systems having multiple connections each operating at the same data rate, as well.

Accordingly, the exemplary embodiments described herein are merely illustrative of the general principles of the invention and should not be construed as limiting the scope of the invention.

What is claimed is:

1. An interface system for connecting a host computer system to an asynchronous transfer mode (ATM) system, said interface system comprising:
   a buffer memory for buffering data;
   a host computer interface element for controlling the transference of data between the buffer memory and the host computer;
   an ATM system interface element for controlling transference of data between the ATM system and the buffer memory; and
   a scheduling element, connected to the host computer interface element and the ATM system interface element, for controlling said host computer interface element to transfer data between the host computer system and the buffer memory responsive to transference of data between the buffer memory and the ATM system by the ATM system interface element.

2. The system of claim 1 wherein:
   said buffer memory includes a transmit buffer memory for buffering data within a plurality of queues, with one queue for each of a plurality of communication connections;
   said host computer interface element includes a transmit load engine for loading data into the queues of said transmit buffer memory;
   said ATM system interface element includes a transmit unload engine for extracting data from said queues of said transmit buffer memory; and
   said scheduler includes a transmit scheduling element, connected to said transmit load engine and said transmit unload engine, for controlling said transmit load engine to store data into queues of said transmit buffer memory responsive to data from said queues being extracted from said transmit buffer memory by said transmit unload engine.

3. The system of claim 2 wherein said transmit scheduler determines when said queues of said transmit buffer memory become nearly empty and controls said transmit load engine to store data into said queues of the transmit buffer memory in the order by which said queues of the transmit buffer memory become nearly empty.

4. The system of claim 3 wherein the transmit scheduler includes a FIFO queue and wherein information identifying nearly empty queues of the transmit buffer are stored within the FIFO queue of the transmit scheduler in the order by which the queues become nearly empty.

5. The system of claim 4 wherein the transmit load engine selects connections for storing data into the transmit buffer memory in accordance with the order by which corresponding queues of the transmit buffer memory are represented within the transmit scheduler.

6. The system of claim 2 wherein data transmitted on said plurality of connections may be transmitted at different rates.

7. The system of claim 2 wherein said system is connected to 128 connections and includes 128 FIFO queues in said transmit buffer memory and 128 FIFO queue entries within said transmit scheduler.

8. The system of claim 2 wherein said transmit load engine stores data from packets into said buffer memory and said transmit unload engine converts data extracted from said buffer memory into cells.

9. The system of claim 1 wherein:
   said buffer memory includes a receive buffer memory for buffering data within one or more queues;
   said ATM system interface element includes a receive load engine for loading data into the queues of the receive buffer memory;
   said host interface element includes a receive unload engine for extracting data from the queues of the receive buffer memory; and
   said scheduling element includes a receive scheduler, connected to said receive load engine and said receive unload engine, for controlling said receive unload engine to extract data from queues of said receive buffer memory responsive to data being stored into said queues by said receive load engine.

10. The system of claim 9 wherein said receive scheduler controls said receive unload engine to extract data from said queues of the receive buffer memory in the order by which said queues of the receive buffer memory become filled.

11. The system of claim 10 wherein the receive scheduler includes a FIFO queue and wherein information identifying queues of the receive buffer memory are stored within the FIFO queue of the receive scheduler in the order by which the queues become filled with at least a minimum amount of data.

12. The system of claim 11 wherein the receive unload engine selects connections for extracting data from the receive buffer memory in accordance with the order by which corresponding queues of the receive buffer memory are represented within the receive scheduler queues.

13. The system of claim 12 wherein data transmitted on said plurality of connections may be transmitted at different rates.

14. The system of claim 13 connected to an ATM system providing a number of virtual data connections and configured for processing a smaller number of physical data connections and wherein said system further includes a cache for caching virtual connections.

15. The system of claim 14 further including a flushing unit for flushing virtual data connections from said cache.

16. The system of claim 15 wherein said flushing unit examines said receive scheduler and does not flush any virtual connection associated with any physical connection which is currently scheduled.

17. The system of claim 9 wherein said receive load engine stores data from cells into said receive buffer memory in packet order and said receive unload engine extracts packets of cells from said receive buffer.

18. A method for controlling transference of data between a host computer and an asynchronous transfer mode (ATM) system, said method comprising the steps of:

for transmitting data to the ATM system
  detecting the availability of data for a data connection;
  controlling a transmit unload engine to initiate a data loading request and to extract data from a queue of a transmit buffer memory;
  controlling a transmit load engine in response to said data loading request to load data for the connection into the queue of the transmit buffer memory corresponding to the connection; and
  further controlling the transmit load engine to store additional data into the queue of the transmit buffer memory in response to the extraction of data from said queue by the transmit unload engine; and for receiving data from the ATM system
  detecting the availability of data corresponding to a data connection;
  controlling a receive load engine to store data corresponding to the data connection in a queue of a receive buffer memory; and
  controlling a receive unload engine to extract data from the queue of the receive buffer memory in response to said data being stored therein.

* * * * *